United States Patent [19]

Kraus et al.

[11] Patent Number: 5,141,639

[45] Date of Patent: Aug. 25, 1992

[54] VACUUM FILTER ASSEMBLY

[75] Inventors: Menahem A. Kraus, Yavne; Jacob Yonath, Rehovot, both of Israel; Dan Vitkuske, Ypsilanti, Mich.

[73] Assignee: Gelman Sciences, Inc., Ann Arbor, Mich.

[21] Appl. No.: 732,966

[22] Filed: Jul. 19, 1991

Related U.S. Application Data

[63] Continuation-in-part of Ser. No. 567,031, Aug. 14, 1990, abandoned.

[51] Int. Cl.$^5$ ............................................. B01D 63/00
[52] U.S. Cl. .......................... 210/321.75; 210/321.84; 210/406; 210/416.1; 210/455; 422/99; 422/101; 604/406
[58] Field of Search ................ 210/416.1, 258, 295, 210/321.75, 321.84, 406, 445, 455; 604/406; 422/99, 101

[56] References Cited

U.S. PATENT DOCUMENTS

| | | | |
|---|---|---|---|
| 2,879,207 | 3/1959 | Poitras | 604/406 |
| 4,523,934 | 6/1985 | Joshua | 210/406 |
| 4,614,585 | 9/1986 | Mehra et al. | 210/445 |
| 4,673,501 | 6/1987 | Wells et al. | 210/406 |

Primary Examiner—Robert A. Dawson
Assistant Examiner—Ana M. Fortuna
Attorney, Agent, or Firm—Krass & Young

[57] ABSTRACT

A vacuum filter assembly for filtering a feed liquid includes a filter membrane held in a cover attachable to the filtrate container. The cover is formed with a feed liquid nipple on one side of the filter membrane, a filtrate outlet tube on the other side of the filter body, and a vacuum port. A portion of the surface of the membrane is non-wettable by the feed liquid to facilitate restarting the filtration if the filtration is interrupted. Also, the vacuum port includes a vacuum tube covered at its end by another membrane having pores permeable by air but not by the feed liquid, for fixing the maximum level of the filtrate within the filtrate container.

20 Claims, 2 Drawing Sheets

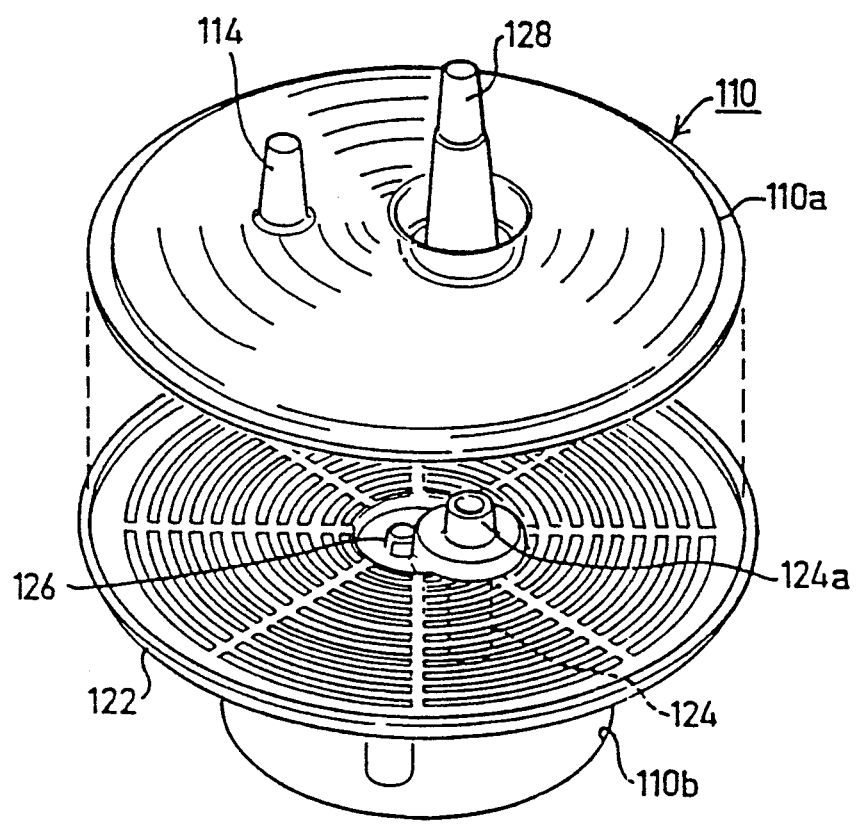

VACUUM FILTER ASSEMBLY

RELATED APPLICATION

This application is a for continuation in part of application Ser. No. 07/567,031 filed Aug. 14, 1990, now abandoned.

FIELD AND BACKGROUND OF THE INVENTION

The present invention relates to vacuum filter assemblies for filtering a feed liquid into a filtrate container. The invention is particularly useful in biological filters used to clarify and sterilize biological solutions such as tissue culture media, and is therefore described below with respect to such an application.

Biological filter assemblies commonly comprise three main parts, namely: a container for the unfiltered feed liquid, a container for the filtrate, and a membrane interposed between the two containers. Examples of such filters are described in U.S. Pat. Nos. 4,357,270, 4,689,147 and 4,702,834. More recently, biological filters have appeared on the market which do not include the filtrate container, but instead are mounted on non-disposable, sterilizable filtrate containers, such as glass bottles.

The above types of biological filter assemblies have a number of drawbacks which make them cumbersome and inconvenient. Thus, they are very bulky, since the feed-liquid container and filtrate container are high volume components and therefore take up a large amount of space, particularly as these devices are disposable and large numbers of these filters are used in biological laboratories. Also, filling the feed-liquid container is inconvenient, which is especially so for the funnel-type filters where the volume of the filtrate container is larger than that of the plastic funnel used in such filter assemblies, thereby requiring the funnel to be refilled a number of times to fill a single filtrate container. This is particularly cumbersome since the feed liquid containers are frequently heavy and hard to lift. Further, should the filter plug during the filtration of a batch, transferring the remaining feed liquid to a new filter is also extremely cumbersome.

OBJECTS AND SUMMARY OF THE INVENTION

An object of the present invention is to provide a vacuum filter assembly having advantages in the above respects.

According to one aspect of the invention, there is provided a vacuum filter assembly for filtering a feed liquid into a filtrate container, comprising: a cover attachable to the filtrate container and including a filter body secured therein; a feed liquid nipple formed in the cover on one side of the filter body for attachment to a feed tube for the feed liquid; a filtrate outlet carried by the cover on the other side of the filter body and located to be disposed within the filtrate container when the cover is attached thereto; and a vacuum port in the cover located to communicate with the interior of the filtrate container when the cover is attached to the filtrate container. The cover seals the filter body within it such that the vacuum produced within the filtrate container is effective to feed liquid from an external feed liquid container through the vacuum filter assembly to the filtrate container.

If, during operation of the above-described filter assembly, an air bubble should accidentally enter the feed line, or if the feed tube should be taken out of the feed container, filtration may not restart. The reason is that when a microporous membrane is wet with a liquid, air will not be able to break through the liquid filled pores of the membrane at pressures less than the "bubble point" of the membrane in that liquid. Typical bubble points for 0.45 and 0.2 μm membranes in water are 35 to 60 psi. Bubble point is related to pore size of a porous medium as:

$$BP = \frac{A\gamma\cos\theta}{r}$$

where:
BP is the bubble point pressure
γ - surface tension of the liquid
θ - contact angle of the liquid with the membrane
r - pore radius
A - a constant Since the air pressure in the device is atmospheric (≈15 psi) the feed liquid would normally not be able to penetrate the wetted membrane if filtration is interrupted and then restarted, and the air pocket thus formed would prevent further liquid from filtering through when the filtration is restarted.

This possible drawback is avoided according to one feature of the present invention, wherein a portion of the surface of the filter body facing the feed liquid inlet is wettable by the feed liquid, and a second portion is non-wettable by the feed liquid to facilitate restarting the filtration by the vacuum within the interior of the filtrate container if the filtration is interrupted.

A vacuum filter assembly constructed in accordance with the above features thus obviates the need for having a separate container in the assembly for the feed-liquid, since the feed liquid is drawn by the vacuum itself directly into the filtrate container by the vacuum produced during filtration. Use of the novel vacuum filter assembly thus obviates the lifting, pouring and refilling operations normally required in using the existing filter assemblies. It also provides for continuous operation, unlike the existing assemblies which are inherently batch devices. Should the filter plug, filtration will just stop with very little residual liquid remaining upstream of the filter. Moreover, since most of the bulk has been eliminated, the vacuum filter assembly is easy to store and does not take up much laboratory space.

In addition, by making a portion of the surface of the membrane non-wettable by the feed liquid, restarting of the filtration is facilitated should the filtration be interrupted. The non-wettable area may be in the form of spots, lines, a grid, or the like. It preferably takes up only a small portion of the overall filter surface. It renders the filter both air and liquid permeable at all times, and therefore, the filtration can be stopped and started at will, for example in order to change the feed-liquid container or the filtrate container.

According to a further feature in the preferred embodiment of the invention described below, the vacuum port includes a vacuum tube adapted to extend into the filtrate container when the cover is attached thereto to a predetermined distance fixing the maximum level of the filtrate within the filtrate container, the end of the vacuum tube being covered by a porous body having pores permeable by air but not by the feed liquid. In the described preferred embodiment, the feed liquid is a water-based liquid, and the porous body is a microporous membrane having a hydrophobic surface facing the filtrate container. Thus, when the level in the filtrate container reaches the hydrophobic microporous membrane, the membrane stops the drawing of air from the filtrate chamber, and filtration will therefore stop shortly afterwards, i.e., when the vacuum in the remaining empty volume diminishes. Such an arrangement permits the filtration to be performed unattended.

An additional advantage of the latter feature is that when the vacuum is broken from the downstream side, the hydrophobic microporous membrane applied over the vacuum line will protect the filtrate from contamination. Breaking the vacuum from the upstream side can also be done simply by permitting air to enter the upstream side of the filter, but this air will have to pass through the filter membrane and therefore will not contaminate the filtrate.

Further features and advantages of the invention will be apparent from the description below.

BRIEF DESCRIPTION OF THE DRAWINGS

The invention is herein described, by way of example only, with reference to the accompanying drawings, wherein:

and FIG. 4 is an exploded view illustrating a modification in the cover structure of the vacuum filter assembly of FIG. 1, with the microporous membrane removed.

DESCRIPTION OF PREFERRED EMBODIMENTS

Figure 1:
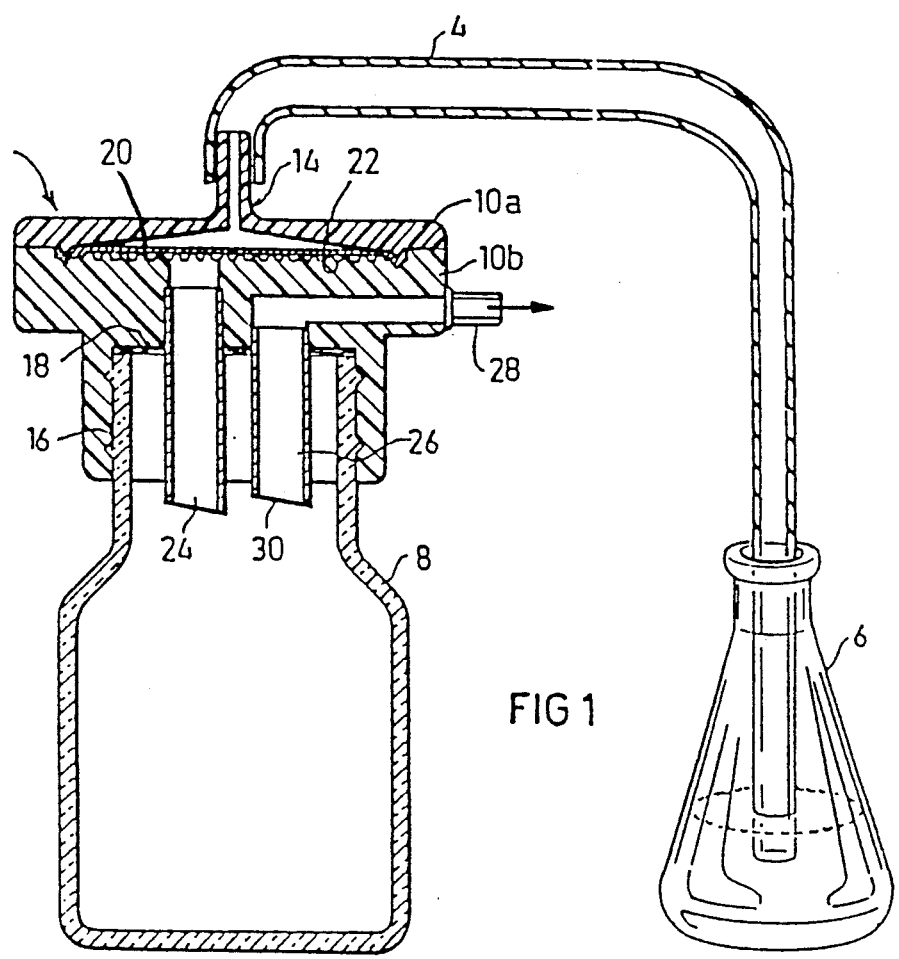
FIG. 1 illustrates a vacuum filter assembly constructed in accordance with the present invention, including the container for the feed liquid and the container for the filtrate.

FIG. 1 illustrates a vacuum filter assembly, generally designated 2, whose upstream side is connected via a feed tube 4 to a container 6 for the feed liquid to be filtered, and whose downstream side is connected to a container 8 (e.g., a bottle) for the filtrate. Such a vacuum filter assembly is particularly useful in biological filters for clarifying and/or sterilizing solutions such as tissue culture media.

The vacuum filter assembly 2 illustrated in FIG. 1 comprises a cover, generally designated 10 constituted of two sections 10a, 10b, attached to each other, e.g., permanently by heat-sealing, or removably as by the use of threaded fasteners (not shown). The outer cover section 10a is integrally formed with a nipple 14 for removably receiving the feed-liquid tube 4. The inner cover section 10b is formed with one or more threads 16 for receiving corresponding threads formed in the neck of the filtrate container 8 for removably attaching the cover 10 to the filtrate container. The inner face of the inner cover section 10b is lined with a seal 18 engageable with the upper edge of the filtrate container 8, when the cover 10 is attached thereto, to effect a seal between the cover and the container.

A microporous membrane 20, and a supporting member 22, are clamped between the two cover sections 10a, 10b when attached together. Microporous membrane 20, as more particularly illustrated in FIG. 3, is formed over its major surface with micropores permeable by the liquid but not by the particles in the liquid to be rejected by the filter.

Figure 3:
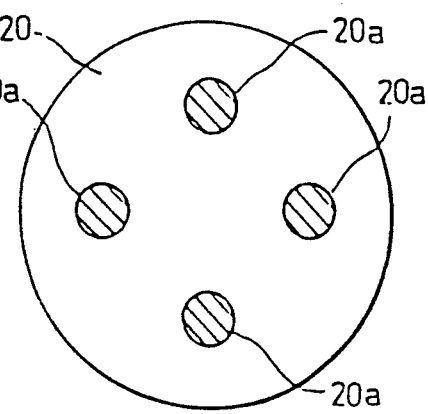
FIG. 3 is a plan view illustrating the filter membrane in the assembly of FIG. 1.

As shown in FIG. 3, the major surface area of membrane 20 is formed with the micropores, but a minor proportion of that surface, shown in the form of spots 20a, is treated, at least on its upstream side to be non-wettable by the feed liquid. Thus, assuming the feed liquid to be filtered is water-based, portions 20a of the filter membrane 20 are made to be hydrophobic. The major portion of the surface of the membrane filter 20 will therefore pass both liquid and air, whereas portions 20a (shown for purposes of example in the form of four spots) will not pass liquid but will pass only air. Accordingly, membrane 20 as a whole is both air and liquid permeable at all times, so that if filtration should be interrupted, spots 20a, not covered by liquid, will permit the filtration to restart.

Supporting member 22 is of the same disc configuration as the filter membrane 20 and is located on the downstream side of the membrane so as to support it during vacuum filtration. Member 22 is corrugated (FIG. 1) and is formed with a number of large arc-shaped openings, 22a, much larger than the pores of membrane 20, to permit the filtrate passing through the membrane also to pass through the supporting member 22 into the filtrate container 8.

The inner cover section 10b further includes a filtrate outlet tube 24 which is located so as to be disposed within the filtrate container 8 when the cover 10 is attached thereto. The inner cover section 10b further includes a vacuum tube 26, also located to be within the filtrate container 8, laterally of the filtrate tube 24. Vacuum tube 26 is connected to a vacuum port 28 carried by the inner cover section 10b, which port is in turn connectible to a source of vacuum (not shown).

The length of vacuum tube 26 determines the maximum level of the filtrate within the filtrate container 8; that is the maximum level will be slightly higher than the end of vacuum tube 26, which end is covered by a porous body 30 having pores therethrough permeable by air but not by the feed liquid. When the feed liquid is a water base solution or suspension, porous body 30 would be a hydrophobic membrane whose pore size and hydrophobicity are chosen, according to the "bubble point" equation set forth above, so as to permit air to pass therethrough but not water.

Accordingly, when the level of the filtrate within container 8 reaches the hydrophobic membrane 30, the vacuum line is automatically disconnected from the interior of container 8, and therefore filtration will stop shortly afterwards, when the vacuum in the remaining empty space of the filtrate container 8 diminishes by air and liquid passing through membrane 20. Hydrophobic membrane 30 applied to the end of the vacuum tube 26 also prevents contamination of the liquid within the filtrate container 8.

The manner of using the vacuum filter assembly illustrated in the drawings will be apparent from the above description.

Whenever a feed solution, such as contained in container 6, is to be filtered, the container is connected by feed tube 4 to nipple 14 of cover 10, and the vacuum port 28 of the cover is connected to a vacuum source. The vacuum so produced in the interior of filtrate container 8 will draw the feed liquid from the feed liquid container 6 (which may be resting on the floor) through membrane 20 and the filtrate outlet 24 into the filtrate container.

During the normal filtering operation, the complete surface of filter membrane 20 is effective to filter the liquid, except for the hydrophobic spots 20a (FIG. 3), which spots are not wetted by the feed liquid, but rather permit only air to pass therethrough. Should the filtration be interrupted for any reason, the hydrophobic spots 20a, being non-wetted by the filter liquid, will enable the air to pass therethrough and therefore will permit the filtration to be resumed.

When the filtrate within container 8 reaches the level of hydrophobic membrane 30 covering the end of the vacuum tube 26, this membrane will block the flow of air from the interior of the filtrate container 8 to the vacuum port 28. Membrane 30 stops the drawing of air from within the filtrate container, so that the filtration operation automatically terminates after sufficient additional liquid has passed into the container to dissipate the vacuum therein. The filtration may therefore be performed unattended.

Figure 2:
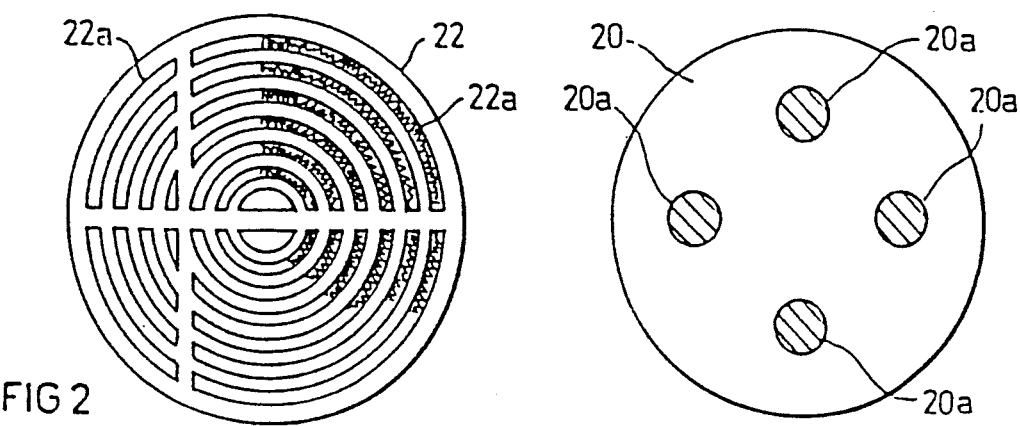
FIG. 2 is a plan view illustrating the supporting member for the filter membrane in the assembly of FIG. 1.

FIG. 4 illustrates a modification in the construction of the cover, therein designated 110, in the vacuum filter assembly. In this modification, the cover 110 also includes an outer cover section 110a and an inner cover section 110b with the microporous membrane (not shown), and its supporting member 122, being clamped between the two cover sections. In addition, the feed-liquid nipple 114 is formed in the outer cover section 110a, and the filtrate outlet tube 126 is carried by the inner cover section 110b and is located so as to be disposed within the filtrate container when the cover is attached, all substantially as described above with respect to FIGS. 1-3.

In the modification illustrated in FIG. 4, however, instead of having the vacuum port being formed in the inner cover section (28, FIG. 1), the vacuum port 128 in the FIG. 4 modification is formed in the outer cover section 110a, and it receives a collar 124a of the vacuum tube 124 carried by the inner cover section 110b.

In all other respects, the device illustrated in FIG. 4 is constructed, and operates in the same manner, as described above with respect to FIGS. 1-3.

While the invention has been described with respect to two preferred embodiments, it will be appreciated that many other variations may be made. For example, while it is preferable to have the cover produce a hermetical seal with respect to container 8, the seal need not be hermetical and may permit some leakage. Also, membrane 20 and its supporting member 22 may be of other constructions than those illustrated. Many other variations, modifications and applications of the invention will be apparent.

What is claimed is:

1. A vacuum filter assembly for filtering a feed liquid into a filtrate container, comprising:
a cover attachable to the filtrate container and including a filter body secured therein;
a feed liquid nipple formed in the cover on one side of the filter body for attachment to a feed tube for the liquid;
a filtrate outlet carried by the cover on the other side of the filter body and located to be disposed within the filtrate container when the cover is attached thereto;
and a vacuum port in the cover located to communicate with the interior of the filtrate container to produce a vacuum within the interior of the container when the cover is attached to the filtrate container and when the vacuum port is connected to a source of vacuum;
said cover sealing said filter body within it such that the vacuum produced within the filtrate container is effective to feed liquid from an external feed liquid container through the vacuum filter assembly to the filtrate container;
said filter body including a membrane having liquid-permeable pores for passing the liquid therethrough to the filtrate container, a first portion of the surface of said membrane facing said feed liquid nipple being wettable by the feed liquid, and a second portion of said surface being non-wettable by the feed liquid to facilitate restarting the filtration by the vacuum within the interior of the filtrate container if the filtration is interrupted.

2. The assembly according to claim 1, wherein the feed liquid is a water-base liquid, and said membrane is a microporous membrane in which said first portion of the surface thereof is hydrophilic and said second portion of the surface thereof is hydrophobic.

3. The assembly according to claim 1, wherein said vacuum port includes a vacuum tube adapted to extend into the filtrate container, when the cover is attached thereto, to a predetermined distance fixing the maximum level of the filtrate within said filtrate container, the end of said vacuum tube being covered by a filter body having pores therethrough permeable by air but not by the feed liquid.

4. The assembly according to claim 3, wherein said latter filter body is a membrane having a surface facing the filtrate which surface is non-wettable by the feed liquid.

5. The assembly according to claim 4, wherein said feed liquid is a water-base liquid, and said latter membrane is a microporous membrane having a hydrophobic surface facing the filtrate.

6. The assembly according to claim 1, wherein said cover includes an outer section formed with said feed-liquid nipple, and an inner section removably attached to said outer section and formed with means for removably attaching the cover to said filtrate container, said filter body being a membrane clamped between said cover sections when attached together.

7. The assembly according to claim 6, wherein said cover further includes a supporting member formed with a plurality of openings substantially larger than the pores of the membrane and clamped with the membrane on the filtrate-container side thereof between the outer and inner sections of the cover when the cover is attached to the filtrate container.

8. The assembly according to claim 6, wherein the inner section of the cover includes a filtrate outlet tube leading to the filtrate container, a vacuum tube leading to said vacuum port, and a seal on the inner surface of the inner section facing the filtrate container when the cover is attached thereto, said seal being penetrated by said filtrate outlet and by said vacuum tube.

9. The assembly according to claim 6, wherein said vacuum port is formed in the inner section of the cover.

10. The assembly according to claim 6, wherein said vacuum port is formed in the outer section of the cover, and receives a collar of a vacuum tube carried by the inner section of the cover.

11. A vacuum filter assembly for filtering a feed liquid into a filtrate container, comprising:

a cover attachable to the filtrate container and including a filter body secured therein;

a feed liquid inlet at one side of the cover for the feed liquid;

a filtrate outlet at the other side of the filter body and located to be disposed within the filtrate container when the cover is attached thereto;

a vacuum port in the cover and located to communicate with the interior of the filtrate container when the cover is attached to the filtrate container;

a vacuum tube adapted to extend into the filtrate container, when the cover is attached thereto, to a predetermined distance fixing the maximum level of the filtrate within said filtrate container;

and a porous body covering the end of said vacuum tube within said filtrate container and having pores therethrough permeable by air but not by the filtrate.

12. The assembly according to claim 11, wherein said porous body is a microporous membrane of which the surface facing the filtrate is non-wettable by the filtrate.

13. The assembly according to claim 12, wherein the microporous membrane is secured within a cover attachable to the filtrate container and is formed with a feed liquid nipple on one side of the membrane attachable to a feed tube for the liquid, said cover further including a filtrate outlet at the other side thereof and located to be disposed within the filtrate container when the cover is attached thereto, and a vacuum port communicating with the interior of the filtrate container when the cover is attached to the filtrate container, said cover sealing said filter body within it such that the vacuum produced within the filtrate container is effective to feed liquid from an external feed liquid container through the vacuum filter assembly to the filtrate container.

14. The assembly according to claim 13, wherein said cover includes an outer section formed with said feed-liquid inlet, and an inner section removably attached to said outer section and formed with means for removably attaching the cover to said filtrate container, said filter body being a membrane clamped between said cover sections when attached together.

15. The assembly according to claim 14, wherein said cover further includes a supporting member formed with a plurality of openings substantially larger than the pores of the membrane and clamped with the membrane on the filtrate-container side thereof between the outer and inner sections of the cover when the cover is attached to the filtrate container.

16. The assembly according to claim 14, wherein the inner section of the cover includes a filtrate outlet tube leading to the filtrate container, a vacuum tube leading to said vacuum port, and a seal on the inner surface of the inner section facing the filtrate container when the cover is attached thereto, said seal being penetrated by said filtrate outlet and by said vacuum tube.

17. The assembly according to claim 14, wherein said vacuum port is formed in the inner section of the cover.

18. The assembly according to claim 14, wherein said vacuum port is formed in the outer section of the cover, and receives a collar of a vacuum tube carried by the inner section of the cover.

19. The assembly according to claim 11, wherein said filter body includes a membrane having liquid-permeable pores for passing the liquid therethrough to the filtrate container, a first portion of the surface of said membrane facing said feed liquid nipple being wettable by the feed liquid, and a second portion of said surface being non-wettable by the feed liquid to facilitate restarting the filtration by the vacuum within the interior of the filtrate container if the filtration is interrupted.

20. The assembly according to claim 19, wherein the feed liquid is a water-base liquid, and said membrane is a microporous membrane in which said portion of the surface thereof is hydrophobic.

* * * * *